(12) United States Patent
Davidson et al.

(10) Patent No.: US 8,549,882 B2
(45) Date of Patent: Oct. 8, 2013

(54) PRE-PROCESSING TECHNIQUES TO PRODUCE COMPLEX EDGES USING A GLASS SLUMPING PROCESS

(75) Inventors: Andrew Davidson, Sunnyvale, CA (US); Michael Kane Pilliod, San Francisco, CA (US); Donald Ross, San Jose, CA (US)

(73) Assignee: Apple Inc., Cupertino, CA (US)

( * ) Notice: Subject to any disclaimer, the term of this patent is extended or adjusted under 35 U.S.C. 154(b) by 231 days.

(21) Appl. No.: 12/571,273

(22) Filed: Sep. 30, 2009

(65) Prior Publication Data

US 2011/0072856 A1 Mar. 31, 2011

(51) Int. Cl.
*C03B 23/025* (2006.01)

(52) U.S. Cl.
CPC .......... *C03B 23/025* (2013.01); *C03B 23/0252* (2013.01)
USPC .................................. 65/107; 65/61; 65/177

(58) Field of Classification Search
CPC .......................... C03B 23/025; C03B 23/0252
USPC ........................................... 65/61, 107, 177
See application file for complete search history.

(56) References Cited

U.S. PATENT DOCUMENTS

| | | | |
|---|---|---|---|
| 2,482,698 A * | 9/1949 | Tillyer | 359/355 |
| 3,558,415 A | 1/1971 | Rieser et al. | |
| 3,607,172 A | 9/1971 | Poole et al. | |
| 3,753,840 A | 8/1973 | Plumat | |
| 3,798,013 A | 3/1974 | Hasegawa et al. | |
| 3,843,472 A | 10/1974 | Toussaint et al. | |
| 4,015,045 A | 3/1977 | Rinehart | |
| 4,059,428 A * | 11/1977 | Andrews | 65/33.1 |
| 4,119,760 A | 10/1978 | Rinehart | |
| 4,165,228 A * | 8/1979 | Ebata et al. | 65/111 |
| 4,178,082 A | 12/1979 | Ganswein et al. | |
| 4,646,722 A | 3/1987 | Silverstein et al. | |
| 4,849,002 A | 7/1989 | Rapp | |
| 4,872,896 A | 10/1989 | LaCourse et al. | |
| 5,369,267 A | 11/1994 | Johnson et al. | |
| 5,545,277 A * | 8/1996 | Hashemi et al. | 156/106 |

(Continued)

FOREIGN PATENT DOCUMENTS

| | | |
|---|---|---|
| AT | 283 630 B | 10/1970 |
| DE | 17 71 268 A1 | 12/1971 |

(Continued)

OTHER PUBLICATIONS

Arun K. Varshneya, Chemical Strengthening of Glass: Lessons Learned and Yet to be Learned, International Journal of Applied Glass Science, 2010, 1, 2, pp. 131-142.

*Primary Examiner* — Christina Johnson
*Assistant Examiner* — Cynthia Szewczyk

(57) ABSTRACT

Apparatus, systems and methods for forming complex edges on a glass member through the use of a glass slumping process are disclosed. According to one aspect of the invention, a method of forming a complex edge in a glass forming process includes grinding an edge of a glass member and polishing the edge of the glass member. Grinding the edge of the glass member causes the edge of the glass member to have a first level of complexity. The method also includes performing a slumping process on the glass member. Performing the slumping process causes the edge of the glass member to have a second level of complexity that is more complex than the first level of complexity.

14 Claims, 8 Drawing Sheets

(56) References Cited

U.S. PATENT DOCUMENTS

| | | | |
|---|---|---|---|
| 5,733,622 A | 3/1998 | Starcke et al. | |
| 5,780,371 A | 7/1998 | Rifqi et al. | |
| 5,930,047 A | 7/1999 | Gunz et al. | |
| 5,953,094 A | 9/1999 | Matsuoka et al. | |
| 6,516,634 B1 | 2/2003 | Green et al. | |
| 6,521,862 B1 * | 2/2003 | Brannon | 219/121.66 |
| 6,621,542 B1 | 9/2003 | Aruga | |
| 6,810,688 B1 | 11/2004 | Guisit et al. | |
| 7,810,355 B2 | 10/2010 | Feinstein et al. | |
| 2002/0035853 A1 * | 3/2002 | Brown et al. | 65/61 |
| 2006/0238695 A1 | 10/2006 | Miyamoto | |
| 2007/0013822 A1 | 1/2007 | Kawata et al. | |
| 2007/0030436 A1 | 2/2007 | Sasabayashi | |
| 2007/0236618 A1 | 10/2007 | Maag et al. | |
| 2008/0202167 A1 * | 8/2008 | Cavallaro et al. | 65/104 |
| 2008/0243321 A1 | 10/2008 | Walser et al. | |
| 2008/0286548 A1 | 11/2008 | Ellison et al. | |
| 2009/0046240 A1 | 2/2009 | Bolton | |
| 2009/0067141 A1 | 3/2009 | Dabov et al. | |
| 2009/0153729 A1 | 6/2009 | Hiltunen et al. | |
| 2009/0197048 A1 | 8/2009 | Amin et al. | |
| 2009/0202808 A1 | 8/2009 | Glaesemann et al. | |
| 2009/0257189 A1 | 10/2009 | Wang et al. | |
| 2009/0324899 A1 | 12/2009 | Feinstein et al. | |
| 2009/0324939 A1 | 12/2009 | Feinstein et al. | |
| 2010/0009154 A1 | 1/2010 | Allan et al. | |
| 2010/0296027 A1 | 11/2010 | Matsuhira et al. | |
| 2010/0315570 A1 | 12/2010 | Dinesh et al. | |
| 2011/0003619 A1 | 1/2011 | Fujii | |
| 2011/0019123 A1 | 1/2011 | Prest et al. | |
| 2011/0019354 A1 | 1/2011 | Prest et al. | |
| 2011/0067447 A1 | 3/2011 | Zadesky et al. | |
| 2011/0102346 A1 | 5/2011 | Orsley et al. | |
| 2011/0159321 A1 | 6/2011 | Eda et al. | |
| 2011/0164372 A1 | 7/2011 | McClure et al. | |
| 2011/0300908 A1 | 12/2011 | Grespan et al. | |
| 2012/0135195 A1 | 5/2012 | Glaesemann et al. | |
| 2012/0281381 A1 | 11/2012 | Sanford | |

FOREIGN PATENT DOCUMENTS

| | | |
|---|---|---|
| DE | 32 12 612 A1 | 10/1983 |
| EP | 2025556 A2 | 2/2009 |
| EP | 2036867 A1 | 3/2009 |
| EP | 2075237 | 7/2009 |
| GB | 1 346 747 | 2/1974 |
| JP | 55-95645 | 7/1980 |
| JP | 55 144450 | 11/1980 |
| JP | 63 060129 | 3/1988 |
| JP | 6242260 A | 9/1994 |
| JP | 2010 064943 | 3/2010 |
| JP | 2010/195600 | 9/2010 |
| WO | WO 00/47529 A | 8/2000 |
| WO | WO 02/42838 A1 | 5/2002 |
| WO | WO 2004/106253 A | 12/2004 |
| WO | WO 2008/143999 A1 | 11/2008 |
| WO | WO 2010/005578 | 1/2010 |
| WO | WO 2010/014163 | 2/2010 |
| WO | WO 2012/106280 | 8/2012 |

* cited by examiner

PRE-PROCESSING TECHNIQUES TO PRODUCE COMPLEX EDGES USING A GLASS SLUMPING PROCESS

BACKGROUND OF THE INVENTION

1. Field of the Invention

The present disclosure relates generally to glass shaping processes and, more particularly, to providing complex edge geometries using glass slumping processes.

2. Description of the Related Art

Grinding processes have been used to create three-dimensional edge shapes on glass parts. Grinding complex edge shapes is complicated, as tools must be created to facilitate accurate grinding along multiple axes. For example, grinding an edge with respect to approximately three axes is difficult, as a grinding tool must be accurately positioned with respect to each of the approximately three axes. Any deviation from a desired position in a single axis may have a significant adverse effect on the overall shape of an edge. In general, it is difficult to grind edges of a glass part to accurately create complex three-dimensional edges. Therefore, what is desired is an efficient method of producing complex edges on glass members.

SUMMARY

The invention pertains to apparatus, systems and methods for forming complex edges on glass parts. According to embodiments of the invention, glass parts having complex curves can be formed with complex edge shapes without complicated grinding processing. For example, glass parts for use in consumer electronic products can be formed with complex curves and with edges having relatively complex shapes.

Embodiments of the apparatus, systems and methods of the invention can provide complex geometries at edges of a glass member by grinding the edges of the glass member, and then performing a slumping process on the glass member. A slumping process may be used to mold glass into a predetermined shape after the edges of the glass member are ground, and to cause the edges of the glass member to effectively be molded into a complex geometry. In general, the edges of the glass member have a more complicated geometry after the slumping process than after the grinding process which precedes the slumping process.

Embodiments of the apparatus, systems, and methods of the invention can allow for the formation of free form parts such as glass members with complex edges that are suitable for glass covers assembled in small form factor electronic devices, such as handheld electronic devices, as for example mobile phones, media players, user input devices (e.g., mouse, touch sensitive devices), personal digital assistants, remote controls, etc. The apparatus, systems, and methods can also be used for glass covers or displays for other relatively larger form factor electronic devices such as portable computers, tablet computers, displays, monitors, televisions, etc.

The invention may be implemented in numerous ways, including as a method, system, device, or apparatus (including computer readable medium). Several embodiments of the invention are discussed below.

According to one embodiment of the invention, a method of forming a complex edge in a glass forming process can include grinding an edge of a glass member and polishing the edge of the glass member. The grinding of the edge of the glass member causes the edge of the glass member to have a first level of complexity. The method can also include performing a slumping process on the glass member. The slumping process causes the edge of the glass member to have a second level of complexity that is more complex than the first level of complexity.

In one embodiment, when the edge of the glass member has the first level of complexity, the edge of the glass member has a first set of characteristics. In such an embodiment, when the edge of the glass member has the second level of complexity, the edge of the glass member has a second set of characteristics. The first set of characteristics may be selected to substantially produce the second set of characteristics after performing the slumping process.

According to another embodiment of the invention, a method of forming at least one complex edge on a glass member can include determining a desired geometry for at least one edge of the glass member, and pre-processing the glass member. The pre-processing of the glass member creates a first geometry at the edge of the glass member. The first geometry allows the desired geometry to be formed at the edge by a slumping technique. Finally, the method can include performing the slumping technique on the glass member after pre-processing the glass member. The slumping technique can cause the desired geometry to be formed at the edge.

In one embodiment, the desired geometry is a complex three-dimensional geometry that is more complex than the first geometry. In another embodiment, pre-processing the glass member includes grinding the edge of the glass member to create the first geometry. According to yet another aspect of the invention, a system for producing a complex edge on a glass member can include a grinding apparatus arranged to grind an edge of a glass member to a first geometry. The system can also include a slumping arrangement that performs a slumping process on the glass member. The slumping arrangement can cause the edge to take on a second geometry that is more complex than the first geometry.

In accordance with still another embodiment of the invention, a method of forming a complex edge on a glass part can include determining a desired edge geometry for the glass part and identifying a pre-slumping edge geometry for the glass part based on the desired edge geometry. The pre-slumping edge geometry can be selected to allow the desired edge geometry to be produced during a slumping process performed on the glass part. The method can also include creating the pre-slumping edge geometry on the glass part, and performing the slumping process on the glass part. The slumping process performed on the glass part can cause the desired edge geometry to be obtained.

The invention provides other embodiments configured to implement the aspects of the invention, as well as software (or computer program code) stored in a computer-readable or machine-readable medium (e.g., a tangible storage medium) to control devices to perform these methods.

Other aspects and advantages of the invention will become apparent from the following detailed description taken in conjunction with the accompanying drawings which illustrate, by way of example, the principles of the invention.

BRIEF DESCRIPTION OF THE DRAWINGS

The accompanying drawings, which are incorporated into and constitute a part of this specification, illustrate one or more example embodiments and, together with the description of example embodiments, serve to explain the principles and implementations associated with the specification.

DETAILED DESCRIPTION OF EMBODIMENTS OF THE INVENTION

Figure 1:
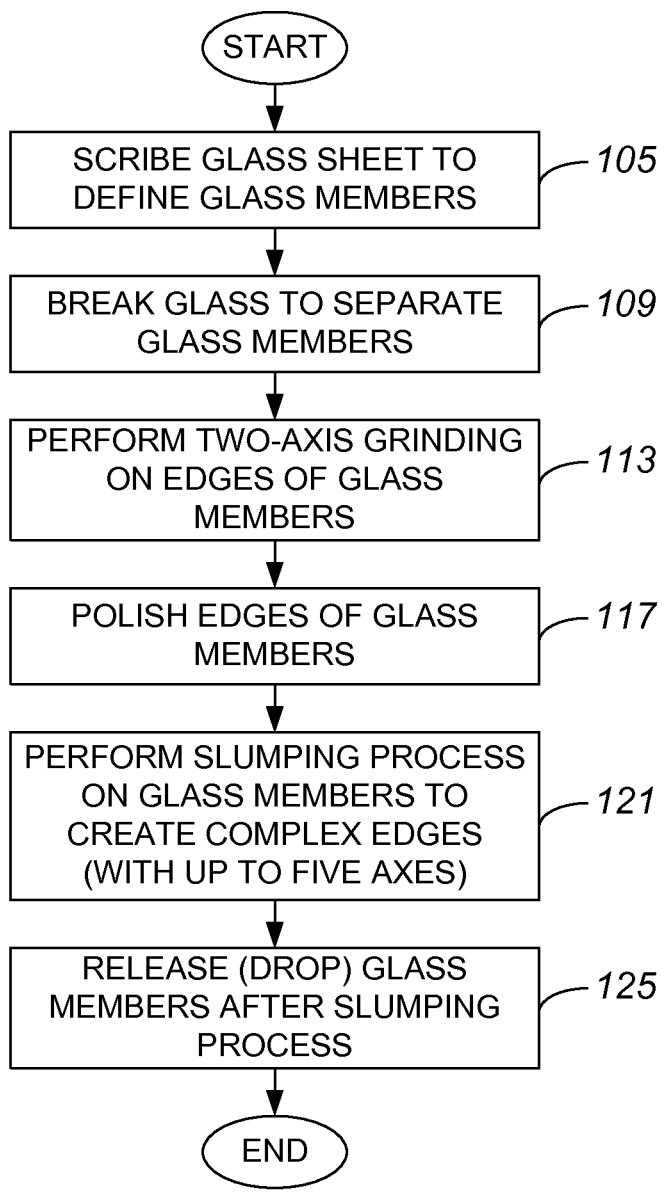
FIG. 1 is a process flow diagram which illustrates one method of producing a relatively complex edge on a glass part or member using a glass slumping process in accordance with an embodiment of the invention.

Grinding complex edges, e.g., edges which involve grinding with respect to multiple axes, on a glass member generally entails a complicated process. For example, it is often difficult to accurately grind complex curves or shapes on a glass member. A complex edge may be a side surface of a glass member that includes angles and surfaces with respect to multiple axes, namely, greater than three axis complexity.

According to embodiments of the invention, glass parts having complex curves can be formed with complex edge shapes without complicated grinding processing. For example, glass parts for use in consumer electronic products can be formed with complex curves and with edges having relatively complex shapes.

Embodiments of the apparatus, systems and methods of the invention can provide complex geometries at edges of a glass member by grinding the edges of the glass member, and then performing a slumping process on the glass member. A slumping process may be used to mold glass into a predetermined shape after the edges of the glass member are ground, and to cause the edges of the glass member to effectively be molded into a complex geometry. In general, the edges of the glass member have a more complicated geometry after the slumping process than after the grinding process which precedes the slumping process.

Embodiments of the apparatus, systems, and methods of the invention can allow for the formation of free form parts such as glass members with complex edges that are suitable for glass covers assembled in small form factor electronic devices, such as handheld electronic devices, as for example mobile phones, media players, user input devices (e.g., mouse, touch sensitive devices), personal digital assistants, remote controls, etc. The apparatus, systems, and methods can also be used for glass covers or displays for other relatively larger form factor electronic devices such as portable computers, tablet computers, displays, monitors, televisions, etc.

Embodiments are described herein in the context of pre-processing glass members such that complex edges may be produced by a glass slumping process. The following detailed description is illustrative only, and is not intended to be in any way limiting. Other embodiments will readily suggest themselves to skilled persons having the benefit of this disclosure. Reference will now be made in detail to implementations as illustrated in the accompanying drawings. The same reference indicators will generally be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In one embodiment, a glass member may be pre-processed such that the edges of the glass member may be ground, or "grinded," into a relatively non-complex shape. A glass slumping process used to process the glass after an edge of the glass member is ground, as well as polished, may effectively cause a complex edge to be formed. That is, a relatively complex edge shape may be produced or formed by grinding a non-complex edge shape prior to a glass slumping process, i.e., while the glass member is effectively in sheet format. Thus, a complex edge shape may essentially be obtained without having to grind the complex edge shape.

Referring initially to FIG. 1, a method of producing a relatively complex edge on a glass member by using a glass slumping process will be described in accordance with an embodiment of the invention. A process 101 of producing a relatively complex edge on a glass member begins at step 105 in which a glass sheet is scribed to define individual glass members. The glass sheet may be scribed using a laser, although the glass sheet is not limited to being scribed by a laser.

After the glass sheet is scribed to define glass members, the glass is broken to separate the glass members in step 109. Then, in step 113, the edges of the glass members are ground. Grinding the edges of the glass members may involve, in one embodiment, grinding the edges of the glass members relative to two different axes. It should be appreciated, however, that grinding the edges of the glass members is not limited to grinding relative to two axes. Typically, the edges are ground into shapes that are not complex. In one embodiment, the edges may be ground into a bevel.

Once the edges of the glass members are ground, the edges of the glass members are polished in step 117. Polishing the edges of the glass members generally allows microcracks and other imperfections in the edges to be substantially removed.

From step 117, process flow moves to step 121 in which a slumping process is performed on the glass members. The slumping process causes complex edges, e.g., edges with up to approximately five axes, or edge geometries to be formed on the glass members. That is, the non-complex edges that were ground in step 113 are effectively turned into complex edges as a result of a slumping process. One suitable slumping process will be described below with respect to FIG. 2. After the slumping process is performed, the glass members are released, e.g., dropped, in step 125, and the process of producing a relatively complex edge is completed.

Edges of a glass member are generally pre-processed, e.g., ground and polished, prior to the glass member being subjected to a slumping process, as previously discussed. Slumping processes may vary generally vary widely. Some suitable slumping processes are described in U.S. patent application Ser. No. 12/401,573, filed Mar. 10, 2009, entitled "Glass Alignment for High Temperature Processes," which is incorporated herein by reference in its entirety.

Figure 2:
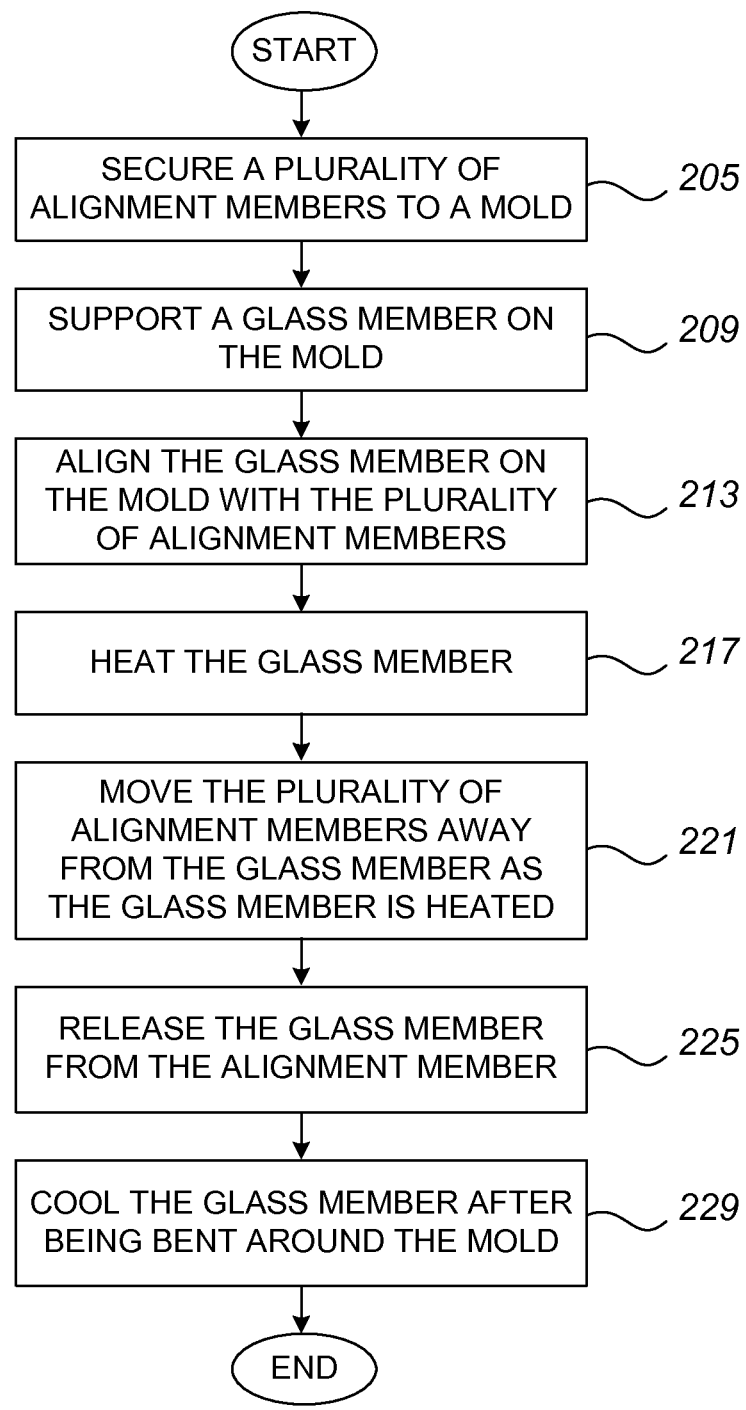
FIG. 2 is a process flow diagram which illustrates a method of slumping a glass member in accordance with an embodiment of the invention.

FIG. 2 is a process flow diagram which illustrates a method of performing a glass slumping process or technique that is suitable for use in producing a complex edge on a glass member in accordance of an embodiment of the invention. The glass slumping process or technique, which occurs after the glass member has been pre-processed, may occur in an oven or on a conveyer belt to process the glass member. A method 201 of performing glass slumping begins at step 205 in which a plurality of alignment members may be removably secured to a mold. Each of the alignment members may be secured, at a bottom end, in a corresponding slot on the mold with a retention member. The retention member may be a low temperature material, magnet, or ball arranged to substantially secure the alignment member to the mold.

The glass member may be supported on the mold at step 209. The alignment members may also align the glass member on the mold at step 213. For example, the alignment member may align the center of the glass member with the center of the mold. A contact member on each of the plurality of alignment members contacts the glass member to provide a slight interference with the glass member to retain the glass member on the mold.

Once aligned, the glass member can be heated at step 216. The temperature of the glass slumping process may vary based upon the type of glass; however, the glass member may generally be heated to a temperature of between about 500° C. to about 800° C. The glass member may then be heated for between about 5 minutes to about 50 minutes. It should be appreciated, however, that both the temperature to which the glass member is heated and an amount of time the glass member is heated may vary widely.

Simultaneously, as the temperature increases and the glass member is heated, each of the plurality of alignment members moves away from the glass member at step 221. The movement of the glass member as a result of heating may be automatic, i.e., without user action. The alignment members may move away from the glass member discretely or continuously. In one embodiment, the alignment member may be bi-metallic such that one metal expands at a faster rate than a second metal. This causes the alignment member to continuously bend and move away from the glass member as it is heated. In another embodiment, the alignment member may be secured to the mold with a low temperature material, such as a wax or adhesive, that melts, burns, or evaporates at high temperatures. The alignment member may then discretely move away from the glass member as the low temperature material is evaporated or melted. In still another embodiment, the alignment member may be secured to the mold with a magnet. At higher temperatures, the magnet can lose its ferromagnetic properties and releases the alignment member from the mold. The alignment member may then discretely move away from the glass member. Accordingly, the movable alignment system allows the glass member to bend around the mold without any interference from the alignment system.

In step 225, the heated glass member is released, as for example dropped, from the alignment members. After the glass member has been fully bent or shaped, e.g., fully slumped, around the mold, the glass member is then cooled at 229. It should be appreciated that bending and cooling the glass member allows the complex edge geometries to form. As the complex edge geometries form when the glass member is bent and cooled, substantially no post-processing of the glass member is needed. In other words, the edges of the glass member do not need to be subjected to a grinding process in order to form desired geometries. Once the glass member is cooled, the process of performing glass slumping is completed.

Figure 3A:
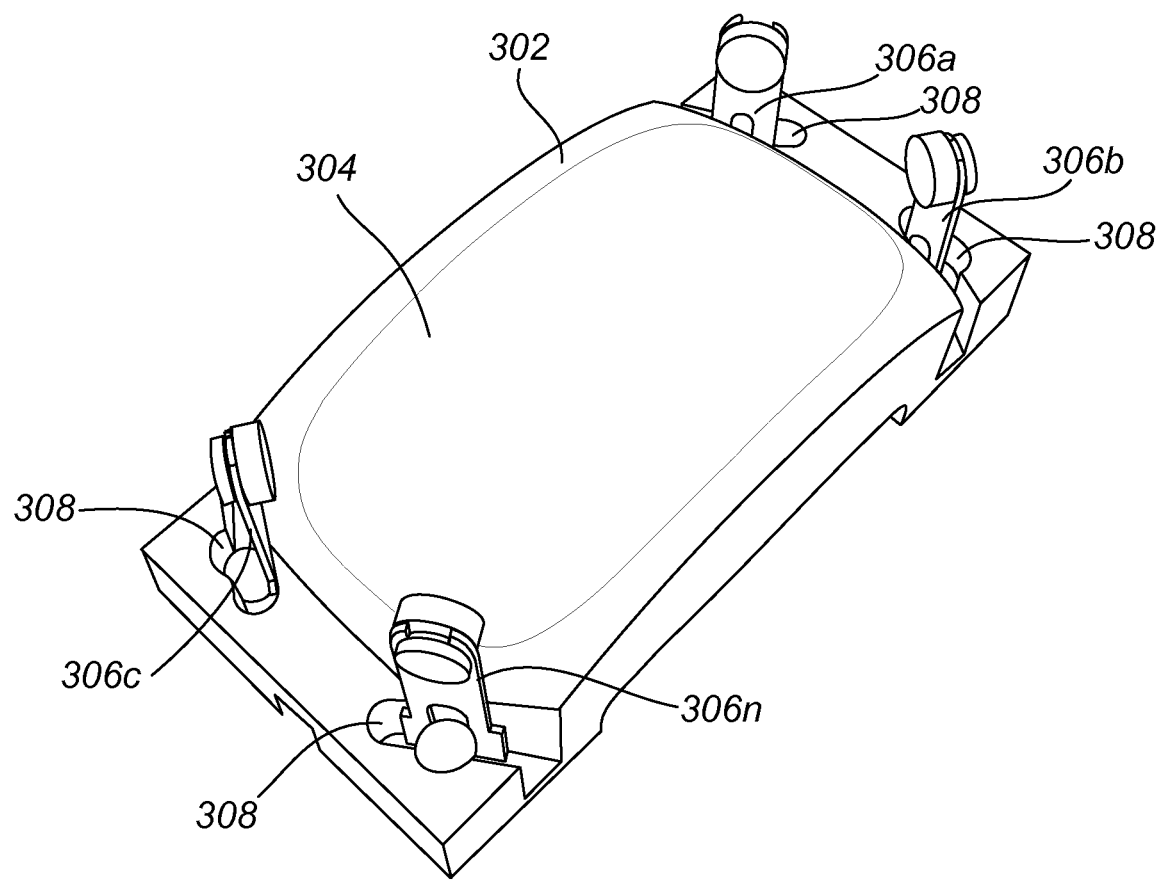
FIGS. 3A and 3B illustrate a perspective view of one embodiment of an alignment system suitable for use in a slumping process in accordance with an embodiment of the invention.
Figure 3B:
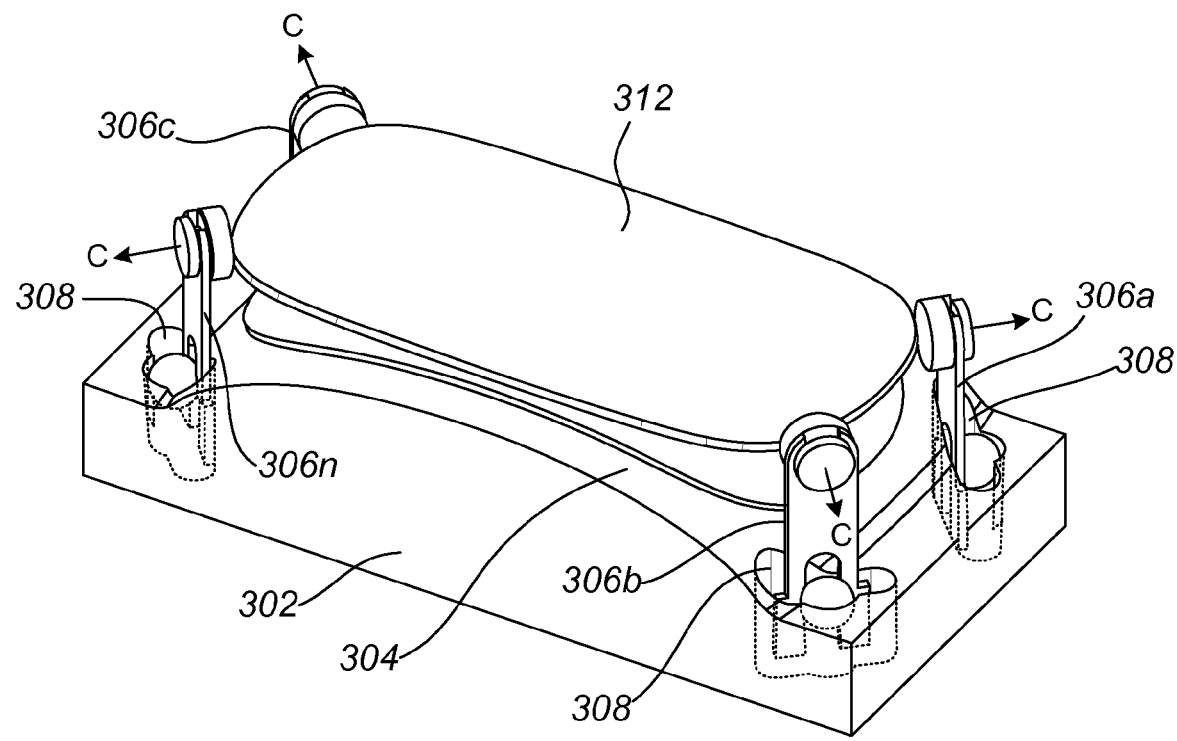

To effectively ensure that a desired complex edge geometry results from a slumping process, the glass member is held by locators of an alignment tool such that after the glass is softened during the slumping process and released from the locators, the glass member essentially falls onto a tool configured to facilitate the formation of the complex edge geometry. With reference to FIGS. 3A and 3B, one embodiment of an alignment system that is suitable for supporting a glass member during a slumping process will be described in accordance with an embodiment of the invention. FIG. 3A illustrates a perspective view of the alignment system coupled to a mold 302 and FIG. 3B illustrates a perspective view of a glass member 312 aligned on mold 302 with the alignment system. Mold 302 has a top surface 304. As illustrated, the top surface 304 has a convex three-dimensional (3D) contour surface. However, this is not intended to be limiting, as the top surface may be any 3D formation, such as a concave 3D contour formation. Mold 302 may be formed of any high temperature resistant material, such as ceramic.

Mold 302 may have a plurality of slots 308 adjacent to top surface 304 to support an alignment system. The alignment system may includes a plurality of alignment members 306a-n (where n is substantially any integer). Alignment members 306a-n may generally be locators arranged to position glass member 312 on mold 302.

As illustrated in FIGS. 3A and 3B, slots 308 are located at each corner 310 of mold 302. However, the location of slots 308 is not intended to be limiting, as the slots 308 may be positioned at substantially any location on mold 302 as may be necessary to align glass member 312 on mold 302. Additionally, although illustrated with four alignment members 306a-n this number is not intended to be limiting as any number of alignment members may be used as necessary to align the glass member 312 on the mold 302.

Figure 4A:
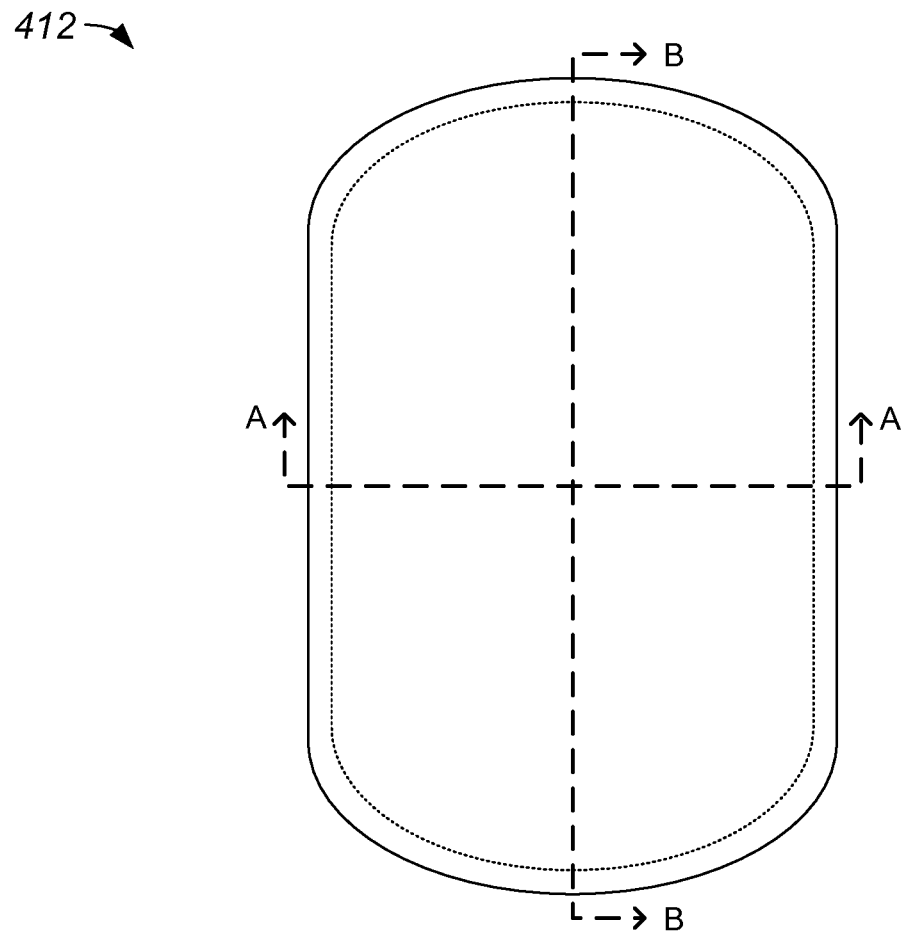
FIG. 4A is a diagrammatic top view representation of a glass member in accordance with an embodiment of the invention.
Figure 4B:
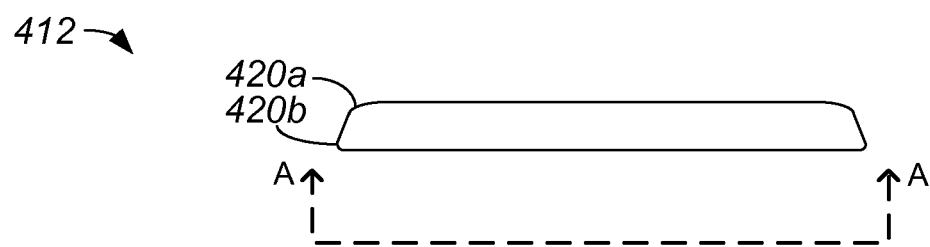
FIG. 4B is a diagrammatic cross-sectional side view representation of a glass member, e.g., glass member 412 of FIG. 4A, prior to a slumping process in accordance with an embodiment of the invention.

With reference to FIGS. 4A-4D, the processing of a glass member will be described in accordance with an embodiment of the invention. FIG. 4A is a diagrammatic top view representation of a glass member, and FIG. 4B is a diagrammatic cross-sectional side view representation of the glass member. A glass member 412 is shown as having a substantially oval shape or footprint, although it should be appreciated that glass member 412 is not limited to having a substantially oval shape.

In order for the edges of glass member 412 to obtain a desired, complex shape after a slumping process, the pre-processing of the edges, e.g., the grinding of the edges, is substantially optimized such that the desired, complex shape may subsequently be achieved. As shown in FIG. 4B, radii 420a, 420b are ground into edges of glass member 412. Radii 420a, 420b may be selected to provide specified, desired angles associated with the edges of glass member 412 after slumping. More generally, pre-processing parameters for the edges of glass member 412 may be chosen based upon a desired final, e.g., post-process, shape for edges of glass member 412.

Figure 4C:
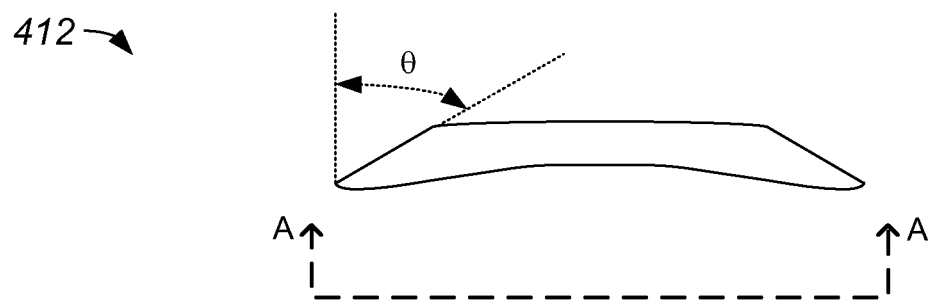
FIG. 4C is a first diagrammatic cross-sectional side view representation of a glass member, e.g., glass member 412 of FIG. 4A, after a slumping process in accordance with an embodiment of the invention.
Figure 4D:
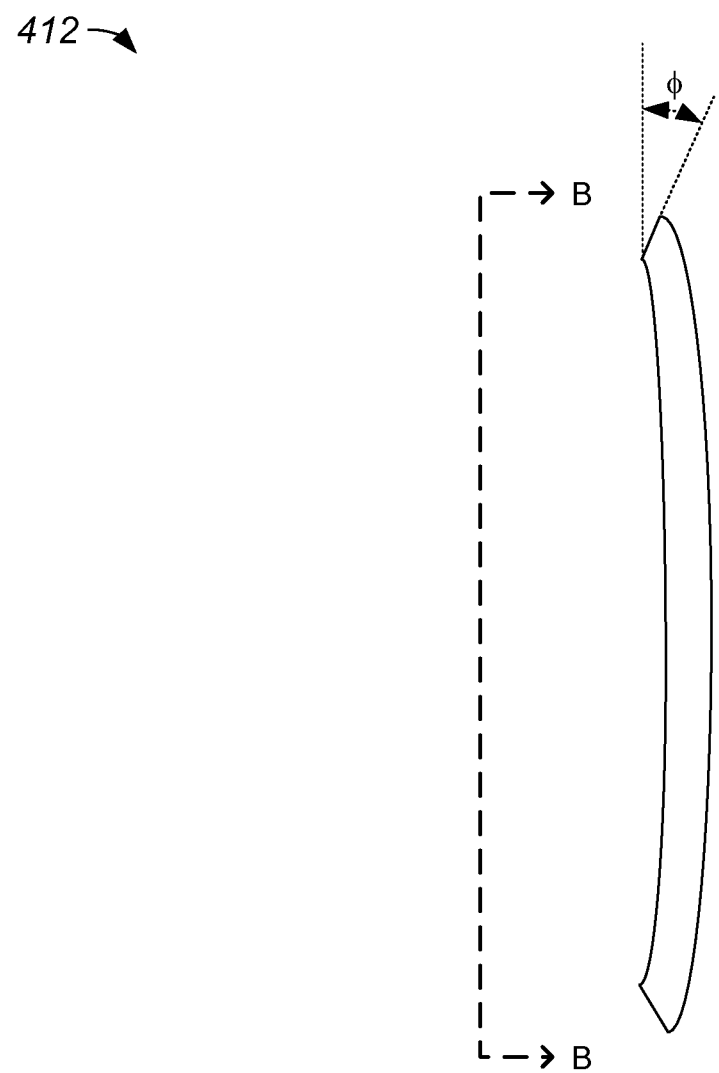
FIG. 4D is a second diagrammatic cross-sectional side view representation of a glass member, e.g., glass member 412 of FIG. 4A, after a slumping process in accordance with an embodiment of the invention.

FIG. 4C is a first diagrammatic cross-sectional side view representation of glass member 412 after a slumping process, and FIG. 4D is a second diagrammatic cross-sectional side view representation of glass member 412 of FIG. 4A, after a slumping process, in accordance with an embodiment of the present invention. After a slumping process, edges of glass member 412 may have an angle θ, measured relative to a first axis, as well as an angle φ measured relative to a second axis. Radii 420a, 420b may generally be selected to achieve angles θ, φ upon the completion of a slumping process. It should be appreciated that radii 420a, 420b may also be chosen to achieve other desired parameters with respect to glass member 412.

Figure 5:
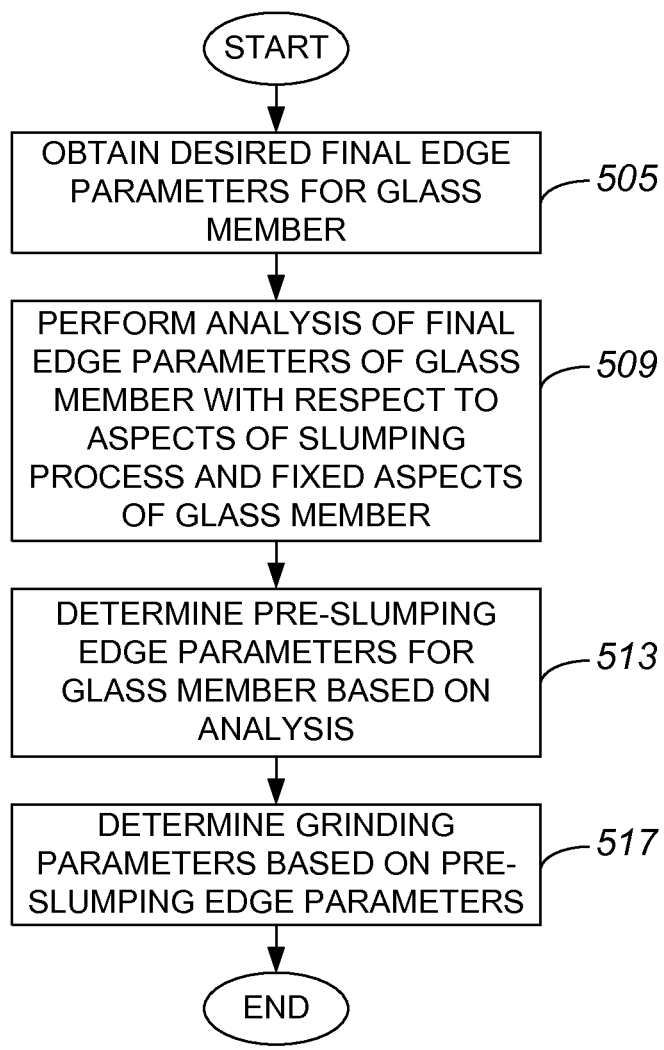
FIG. 5 is a process flow diagram which illustrates a method of obtaining pre-slumping glass edge grinding parameters suitable for creating complex edge geometries after a slumping process in accordance with an embodiment of the invention.

In general, prior to pre-processing the edges of a glass member, an appropriate shape for the edges may be determined. That is, the shape of the edges that is suitable for achieving desired, complex edges after slumping are identified prior to grinding the edges. FIG. 5 is a process flow diagram which illustrates a method of obtaining pre-processing edge grinding parameters suitable for creating complex edge geometries after a slumping process in accordance with an embodiment of the present invention. A process 501 of obtaining pre-processing edge grinding parameters begins at step 505 in which desired final edge parameters of characteristics for a glass member are obtained. The desired final edge parameters generally specify a desired edge geometry or shape. Specifying a desired edge geometry or shape may include, but is not limited to including, specifying angles, curves, lengths, and heights associated with the edge of a glass member. Desired final edge parameters may generally be based upon requirements of a device, e.g., a portable media device, onto which the glass member is to be assembled.

After the desired final edge parameters are obtained, an analysis is performed in step 509 based on the final edge parameters. The analysis is performed with respect to aspects of a glass slumping process and fixed aspects of the glass member. In other words, tools used for a glass slumping process such as an alignment tool, as well as dimensions of the glass member, e.g., surface curvatures and overall thicknesses, may be analyzed. Such an analysis may be performed to determine how the edges of the glass member are to be pre-processed to produce the desired final edge parameters upon completion of a glass slumping process. Software executing on a computing system may be used to perform the analysis, although it should be appreciated that the analysis is not limited to be performed using a computing system.

Once analysis of the final edge parameters of the glass member is performed, pre-slumping edge parameters are determined in step 513. The pre-slumping edge parameters are determined based on the analysis of the final edge parameters. In general, the pre-slumping edge parameters may include angles and curves, e.g., radii, associated with the edges of the glass member. For example, determining pre-slumping edge parameters may include determining appropriate radii 420a, 420b, as shown in FIG. 4B, for edges of a glass member.

In step 517, grinding parameters are determined based on the pre-slumping edge parameters. That is, parameters to be used by a grinding tool are determined. By way of example, if pre-slumping edge parameters specify how an edges of a glass member are to be ground relative to two axes, determining the grinding parameters may include determining how a grinding tool is to be configured, e.g., positioned, in order to achieve appropriate grinding relative to the two axes. The process of obtaining pre-processing grinding parameters is completed once the grinding parameters are determined.

Figure 6:
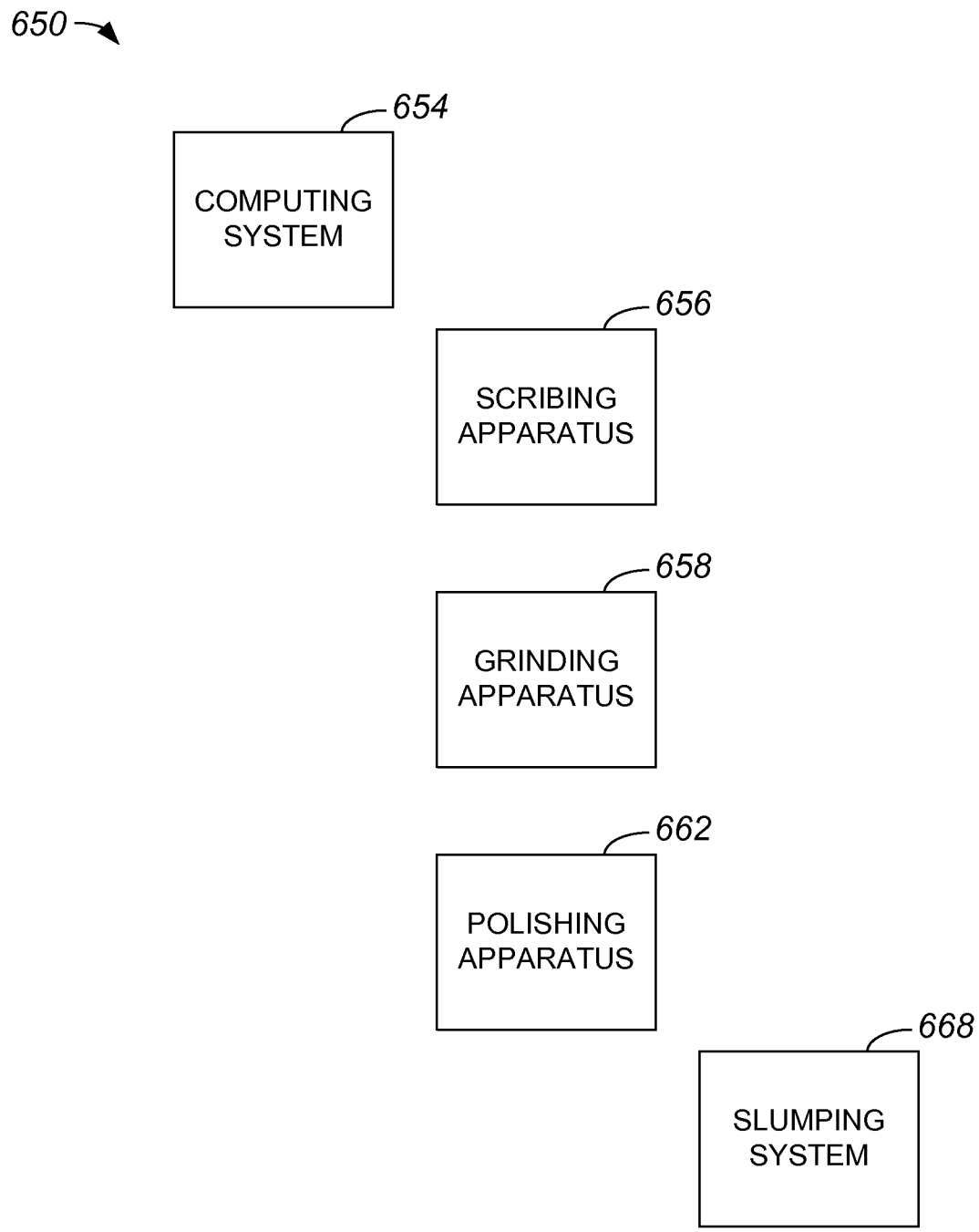
FIG. 6 is a block diagram representation of an overall system which is suitable for forming a complex edge on a glass member in accordance with an embodiment of the invention.

FIG. 6 is a block diagram representation of an overall system which is suitable for forming a complex edge on a glass member in accordance with an embodiment of the invention. An overall system 650 includes a computing system 654, a scribing apparatus 656, a grinding apparatus 658, a polishing apparatus 662, and a slumping system 668.

Computing system 654 is arranged to execute methods which allow parameters associated with system 650 to be determined. For example, computing system 654 may enable geometries of ground edges to be determined based on the final edge geometries desired, or the edge geometries desired as a result of a slumping process. In other words, computing system 654 may execute algorithms which determine the geometries, e.g., curves and angles, to grind into the glass members such that desired, complex edges may be formed or otherwise produced during a slumping process.

Scribing apparatus 656 is generally configured to scribe a glass sheet to effectively define glass members on which complex edges are to be formed. Scribing apparatus 656 may include a laser that scribes surfaces of the glass sheet.

Grinding apparatus 658 is configured to grind edges on glass members. Grinding apparatus 658 may be arranged to grind surfaces of glass members along any number of axes, e.g., approximately two axes. In one embodiment, grinding apparatus 658 may obtain information from computing system 654 that specifies how tools within grinding apparatus 658 may be positioned and moved to generate desired pre-processing geometries, i.e., pre-slumping edge parameters, for the edges of the glass members.

Polishing apparatus 662 is arranged to polish glass members. In particular, polishing apparatus 662 may be arranged to polish ground edges of glass members to substantially remove microcracks or other imperfections on the ground edges of glass members.

Slumping system 668 is generally configured to perform a slumping process or technique on glass members such that the glass members may include complex, three-dimensional edges. Slumping system 668 is configured to process the glass members such that during the course of heating, shaping, and cooling the glass members, the edges of the glass members effectively take on a desired three-dimensional shape. In other words, slumping system 668 causes the pre-processing geometries ground on the edges of the glass members to essentially give rise to more complex edge geometries.

The complex edge geometries for glass members as provided for herein can serve to produce the glass members in a reliable manner. The complex edge geometries may also strengthen the glass members. Strengthening of glass members through use of edge geometries and/or chemically strengthening are described in (i) U.S. Provisional Patent Application No. 61/156,803, filed Mar. 2, 2009, entitled "Techniques for Strengthening Glass Covers for Portable Electronic Devices," which is incorporated herein by reference in its entirety; and (ii) U.S. Provisional Patent Application No. 61/247,493, filed concurrently herewith, entitled "Techniques for Strengthening Glass Covers for Portable Electronic Devices."

The techniques describe herein may be applied to a variety of electronic devices including but not limited handheld electronic devices, portable electronic devices and substantially stationary electronic devices. Examples of these include any known consumer electronic device that includes a display. By way of example, and not by way of limitation, the electronic device may correspond to media players, mobile phones (e.g., cellular phones), user input device (e.g., mouse, touch-sensitive devices), personal digital assistants (PDAs), remote controls, notebooks, tablet computing devices, monitors, all in one computers and the like.

Although only a few embodiments of the invention have been described, it should be understood that the invention may be embodied in many other specific forms without departing from the spirit or the scope of the invention. By way of example, tools or system used to perform slumping may vary widely. While one embodiment of a suitable alignment tool that may be used in a slumping process has been described, may other alignment tools may be suitable.

In general, the steps associated with the methods of the invention may vary widely. Steps may be added, removed, altered, combined, and reordered without departing from the spirit or the scope of the invention.

The various aspects, features, embodiments or implementations of the invention described above may be used alone or in various combinations.

While this specification contains many specifics, these should not be construed as limitations on the scope of the disclosure or of what may be claimed, but rather as descriptions of features specific to particular embodiment of the disclosure. Certain features that are described in the context of separate embodiments may also be implemented in combination. Conversely, various features that are described in the context of a single embodiment may also be implemented in multiple embodiments separately or in any suitable subcombination. Moreover, although features may be described above as acting in certain combinations, one or more features from a claimed combination can in some cases be excised from the combination, and the claimed combination may be directed to a subcombination or variation of a subcombination.

While embodiments and applications have been shown and described, it would be apparent to those skilled in the art having the benefit of this disclosure that many more modifications than mentioned above are possible without departing from the inventive concepts herein.

What is claimed is:

1. A method of forming a complex edge in a glass forming process, the method comprising:
    grinding an edge of a glass member, wherein grinding the edge of the glass member causes the edge of the glass member to have a first level of complexity;
    polishing the edge of the glass member; and
    performing a slumping process on the entire glass member, wherein the performing of the slumping process causes the edge of the glass member to have a second level of complexity, the second level of complexity being a curve.

2. The method of claim 1 wherein the second level of complexity includes a complex three-dimensional edge geometry.

3. The method of claim 1 wherein the first level of complexity is associated with approximately two axes and the second level of complexity is associated with approximately five axes, wherein complex curves are formed by the second level of complexity.

4. The method of claim 1 further comprising:
    obtaining a glass sheet;
    scribing the glass sheet, wherein scribing the glass sheet includes defining the glass member within the glass sheet; and
    breaking the glass sheet to remove the glass member.

5. The method of claim 1 wherein when the edge of the glass member has the first level of complexity, the edge of the glass member has a first set of edge characteristics, and wherein when the edge of the glass member has the second level of complexity, the edge of the glass member has a second set of edge characteristics, the set of edge characteristics specifying at least one length, at least one height, and at least one angle.

6. The method of claim 5 further comprising:
    selecting the first set of edge characteristics based on the second set of edge characteristics, wherein the first set of edge characteristics is selected to substantially produce the second set of edge characteristics after performing the slumping process.

7. A method of forming at least one complex edge on a glass member, the method comprising:
    inputting into a computing system final geometry for at least one edge of the glass member;
    pre-processing the glass member, wherein pre-processing the glass member creates a first geometry at the at least one edge of the glass member, the first geometry being arranged to allow the final geometry to be formed at the at least one edge of the glass member by a slumping technique; and
    performing the slumping technique on the entire glass member after pre-processing the glass member, wherein the performing of the slumping technique on the glass member causes the final geometry to be formed at the at least one edge of the glass member.

8. The method of claim 7 wherein the final geometry is a complex three-dimensional geometry, the final geometry being more complex than the first geometry.

9. The method of claim 7 wherein pre-processing the glass member includes grinding the at least one edge of the glass member to create the first geometry.

10. The method of claim 9 wherein pre-processing the glass member further includes polishing the at least one edge of the glass member.

11. The method of claim 7 further comprising:
    obtaining a glass sheet;
    scribing the glass sheet to define the glass member; and
    removing the glass member from the glass sheet.

12. A system for producing a complex edge on a glass member, the system comprising:
    a grinding apparatus, the grinding apparatus being arranged to grind an edge of a glass member;
    a slumping arrangement, the slumping arrangement being arranged to perform a slumping process on the entire glass member; and
    a computing apparatus, the computing apparatus being arranged to control one or more operations of the grinding apparatus and the slumping arrangement;
    wherein the computing apparatus is programmed to:
        pre-process the glass member using the grinding apparatus to create a first geometry at the at least one edge of the glass member, the first geometry being arranged to allow a final geometry to be formed at the at least one edge of the glass member by a slumping technique; and
        perform the slumping technique on the entire glass member using the slumping arrangement after the glass member has been pre-processed, wherein the performing of the slumping technique on the glass member causes the final geometry to be formed at the at least one edge of the glass member.

13. The system of claim 12 further comprising:
    a polishing apparatus, the polishing apparatus being arranged to polish the edge after the edge is ground to the first geometry.

14. The system of claim 12 further comprising:
a scribing apparatus, the scribing apparatus being arranged to scribe a glass sheet to define the glass member.

* * * * *

UNITED STATES PATENT AND TRADEMARK OFFICE
CERTIFICATE OF CORRECTION

PATENT NO.       : 8,549,882 B2                                              Page 1 of 1
APPLICATION NO.  : 12/571273
DATED            : October 8, 2013
INVENTOR(S)      : Davidson et al.

It is certified that error appears in the above-identified patent and that said Letters Patent is hereby corrected as shown below:

In the claims

Col. 10, line 15 (Claim 7, line 3), change "final" to --a final--.

Signed and Sealed this
Fourteenth Day of June, 2016

Michelle K. Lee
*Director of the United States Patent and Trademark Office*